United States Patent [19]
Binsack et al.

[11] 3,931,108
[45] Jan. 6, 1976

[54] PROCESS FOR PREPARING POLYCARBONATES

[75] Inventors: Rudolf Binsack; Heinrich Haupt; Hugo Vernaleken, all of Krefeld; Eckart Reese, Dormagen, all of Germany

[73] Assignee: Bayer Aktiengesellschaft, Leverkusen Bayerwerk, Germany

[22] Filed: Oct. 24, 1973

[21] Appl. No.: 409,201

[30] Foreign Application Priority Data
Nov. 9, 1972    Germany............................ 2254917

[52] U.S. Cl................ 260/47 XA; 260/49; 260/463
[51] Int. Cl.$^2$......................................... C08G 63/62
[58] Field of Search ............................... 260/47 XA

[56] References Cited
UNITED STATES PATENTS
3,646,102    2/1972    Kobayashi et al.............. 260/47 XA
R27,682    6/1973    Schnell et al. ................. 260/47 XA FOREIGN PATENTS OR APPLICATIONS
715,142    8/1965    Canada.......................... 260/47 XA

*Primary Examiner*—Wilbert J. Briggs, Sr.
*Attorney, Agent, or Firm*—Lawrence S. Pope

[57] ABSTRACT

Extruded films having reduced proneness to stress-cracking, good resistance to casting resins of unsaturated polyesters and no blocking effect and produced from branched aromatic polycarbonates which are the reaction products of aromatic dihydroxy compounds and branching agents having more than three phenolic hydroxyl groups, with polycarbonate precursors. The films are useful as insulating films in the electrical industry.

6 Claims, No Drawings

PROCESS FOR PREPARING POLYCARBONATES

BACKGROUND OF THE INVENTION

Aromatic polycarbonates based on bis-(hydroxyphenyl)-alkanes, especially 2,2-bis-(4-hydroxyphenyl)-propane, can be converted into films which are used, in particular, as electrical insulating films in the electrical industry (see, for example, DT-PS 971,790; *Angew. Chem.* 74, 1962, pages 647 to 650).

As a rule, such films are manufactured from solutions by casting. They can, however, also be obtained by extrusion through slit dies. If such films come into contact with organic non-solvents, for example carbon tetrachloride, their mechanical properties can be severely impaired, especially if the films are exposed to stresses during the action of such non-solvents. This can reach the point of the films breaking after a relatively short time. This property is known to experts as "stress-cracking."

Since, when using the electrical insulating films, the insulated parts may come into contact with non-solvents, for example, for the purpose of removing traces of grease and oil, it is only possible to use electrical insulating films whereof the proneness to stress-cracking is as low as possible.

As the viscosity of polycarbonates increases, the films manufactured therefrom show a reduction in the proneness to stress-cracking. At a relative viscosity of 1.70 (0.5 g in 100 ml of methylene chloride solution), corresponding to an average molecular weight of about 70,000, the proneness to stress-cracking is so slight that the usability of the films is no longer impaired.

Polycarbonates having such a high viscosity, however, cannot be processed into films on extuders, since at the high processing temperatures required for the purpose the polycarbonate is so severely damaged with an associated loss of an important part of the properties, that the material can no longer be used as an electrical insulating film. Hence, only polycarbonate of substantially lower viscosities can be extruded to give films. All extruded polycarbonate films corresponding to the state of the art, therefore, are unable to be used as an electrical insulating film, or can only be used to a very restricted degree, because of their proneness to stress-cracking Polycarbonate films which are used for the insulation of electrical coils in addition to having a low susceptability to stress-cracking, must also be resistant to styrene solutions of unsaturated polyester casting resins since these coils are frequently potted in such casting resins. The known extruded polycarbonate films, because of their low viscosity, do not show sufficient resistance towards the styrene solutions of the unsaturated polyester casting resins used. They can, therefore, not be used for coil insulation.

Cast polycarbonate films and extruded polycarbonate films tend to adhere strongly to themselves. This phenomenon is known to experts as the "blocking effect" or "stick-slip effect."

This effect interferes with the manufacture and especially the processing of the films. This adhesion is circumvented, for example, by roughening one side of the films during manufacture. It is also known that the mutual adhesion of films can largely be prevented by additives, for example of silicone dioxide or talc.

SUMMARY OF THE INVENTION

It has now been found, surprisingly, that films of branched aromatic polycarbonates which are branched through polyphenols with more than 3, preferably 4, reactive hydroxyl groups, show, as compared to films of linear aromatic polycarbonates or branched aromatic polycarbonates which are branched through polyphenols with 3 reactive hydroxyl groups, at the same relative viscosity a. substantially reduced proneness to stress-cracking, b. resistance to unsaturated polyester casting resins, and c. no blocking effect.

This property manifests itself, in particular, with branched polycarbonates of relative viscosities ≥ 1.30 (0.5 g in 100 ml of methylene chloride solution), or, in other words, in polycarbonates, the melt viscosities of which are low enough that they can, without serious damage, be extruded to give films.

A particular advantageous type of branching of polycarbonates for the manufacture of the extruded films according to the invention is obtained if the polycarbonate molecules possess branches with short side chains and the degree of branching is taken to near the polymer gel point, corresponding to ≥ 0.8 branches per polycarbonate molecule.

The branched polycarbonates of the invention may have relative viscosities between 1.30 and 1.80, preferably between 1.35 and 1.55, with the proviso that the polycarbonates can be extruded on the existing machines.

Short side chains in the sense of the invention are polycarbonate radicals consisting of the following formula

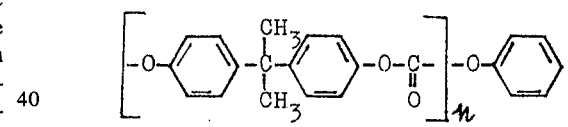

($n$ = between 5 and 5) if, e.g., these side chains are based on bisphenol A and phenol as chain stopper. Of course, the other end of these side chains is linked to the polycarbonate molecule via a branching agent incorporated in the polycarbonate molecule.

The amount of ≥ 0.8 branches per polycarbonate molecule has a natural upper limit which is caused by cross-linking of the branched polycarbonate molecule. A polycarbonate being absolutely insoluble in polycarbonate solvents, is not useful and therefore not embraced by the instant invention.

DETAILED DESCRIPTION

The branched polycarbonates which can be employed for the manufacture of the extruded films according to the invention are manufactured under polycarbonate-forming conditions which are in themselves known such as, for example, those of the transesterification process, the solution condensation process and the phase boundary condensation process (see the process described in U.S. Pat. No. Re. 27,682 which is hereby incorporated by reference), by reaction of bisphenols, aromatic dihydroxy compounds, with derivatives of carbonic acid which form polycarbonates, in the presence of about 0.05 to 2.0 mol percent, preferably 0.05 to 0.5 mol per cent, of branching agents with more than three, preferably four, reactive phenolic hydroxyl groups, relative to the mols of bisphenols, and also preferably in the presence of such amounts of monophenols that branched polycarbonates with relative viscosities 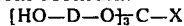 1.30 (0.5 g in 100 ml of methylene chloride solution at 25°C) are produced.

A preferred embodiment, which in particular favors the advantageous short chain branching, for the manufacture of branched polycarbonates for the extruded films according to the invention consists of carrying out the reaction of aqueous-alkaline solutions of bisphenols with phosgene under the conditions of a phase boundary reaction to give an oligomeric polycarbonate with a degree of polymerization of 5 to 15 and to complete the condensation, to give a high molecular branched polycarbonate, by subsequent addition of tertiary amine and branching agent. This and other suitable methods are illustrated in the Examples.

In theory, any polyhydric phenols having more than 3, preferably 4, reactive hydroxyl groups may be employed in producing branched polycarbonates suitable for producing the extruded films of the invention. Particularly suitable branching agents have proved to be organic compounds in which radicals of monohydric phenols are linked to one another through aliphatic, cycloaliphatic or araliphatic groups, or the so-called ortho-esters of carbonic acid, or the ortho-esters of monocarboxylic or dicarboxylic acids, especially of aromatic monocarboxylic or dicarboxylic acids such as isophthalic acid or terephthalic acid, with dihydric phenols, especially bis-(hydroxyphenyl)-alkanes, of which one phenolic group is esterified. These particularly suitable ortho-esters may be illustrated by the general formula:

[HO—D—O$\frac{1}{3}$C—X

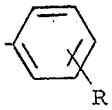

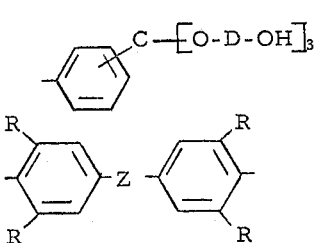

R = H, $C_1$–$C_4$ alkyl or halogen
Z = $C_1$–$C_{10}$ alkylene or $C_3$–$C_{10}$ cycloalkylene, $C_2$–$C_{15}$ alkylidene or $C_3$–$C_{15}$ cycloalkylidene, a single bond, —O—, —S—, —SO—, —SO$_2$—, —CO—, or

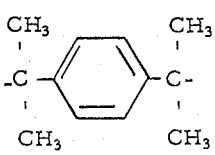

Examples of suitable branching agents are 2,2-bis-[4,4-(4-hydroxyphenyl)-cyclohexyl]-propane (see U.S. Pat. No. Re. 27,682); hexa-(4-(2-(4-hydroxyphenyl)-isopropyl)-phenyl)-ortho-terephthalic acid ester (the preparation of which is described in Example 3b); and preferably tetra-(4-hydroxyphenyl)-methane (the preparation of which is described in Example 2a–c); tetra-[4-(dimethyl-4-hydroxyphenyl)-methyl-phenoxy]-methane (the preparation of which is described in Example 5); and 1,4-bis-[(4',4''-dihydroxytriphenyl)-methyl]-benzene (the preparation of which is described in commonly owned application Ser. No. 285,699).

Examples of suitable monophenols are alkylphenols, such as the methylphenols, the ethylphenols, the propylphenols and the isopropylphenols and the butylphenols, especially p-tert.-butylphenol, as well as unsubstituted phenol.

The branched polycarbonates of the invention may have relative viscosities between 1.30 and 1.80, preferably between 1.35 and 1.55, with the proviso that the polycarbonates can be extruded on the existing machines.

Suitable aromatic dihydroxy compounds which may be cocondensed with the branching agents of the invention are, for example, hydroquinone; resorcinol; 4,4'-dihydroxydiphenyl; bis-(hydroxyphenyl)-$C_1$–$C_8$-alkanes, -$C_5$–$C_{15}$-cycloalkanes, -sulfides, -ethers, -ketones, -sulfoxides or -sulfones, and also $\alpha,\alpha'$-bis-(hydroxyphenyl)-diisopropylbenzene and the corresponding nuclear-alkylated and nuclear-halogenated compounds. Polycarbonates based on 4,4'-dihydroxydiphenylpropane-2,2 (bisphenol A), tetrachlorobisphenol A, tetrabromobisphenol A, tetramethylbisphenol A and trinuclearbisphenols, such as $\alpha,\alpha'$-bis-(4-hydroxyphenyl)-p-diisopropylbenzene, and mixtures of these compounds, are preferred.

Further bisphenols suitable for the manufacture of polycarbonate are described in U.S. Pat. Nos. 3,028,365, 2,999,835, 3,148,172, 3,271,368, 2,970,137, 2,991,273, 3,271,367, 3,280,078, 3,014,891 and 2,999,846.

The branched polycarbonates which can be used for the extruded films according to the invention which have relative viscosities of ≥ 1.30 (0.5 g in 100 ml of methylene chloride solution at 25°C) possess, in the form of films, the properties required for their use as electrical insulating films with regard to low proneness to stress-cracking, resistance to unsaturated polyester resins and low tendency to mutual adhesion.

An upper limit to the relative viscosity of the branched polycarbonates is imposed solely by the processability on the extruders corresponding to the state of the art.

The processing of the branched polycarbonates to give films can be carried out for example on normal single-flight free-zone screws conforming to the state of the art, and the shaping to give films can be effected either by means of slit dies to give flat films or via film-blowing heads to give blown films.

The films according to the invention can be cut, wound up and processed further at high speeds, since they do not show a blocking effect. In addition to their low proneness to stress-cracking and in addition to their resistance to unsaturated polyester casting resins, they show the good mechanical and dielectric properties typical for polycarbonate films. They are, therefore, outstandingly suitable for use as electrical insulating films.

The invention is further illustrated, but is not intended to be limited by, the following examples in which all parts and percentages are by weight unless otherwise specified. The relative viscosities quoted relate to a concentration of polycarbonate in 100 ml of methylene chloride solution at 25°C.

EXAMPLES

Example 1

1,790 G of phosgene are introduced, at 25°C, into a well-stirred mixture of 3,440 g of bisphenol A, 90 g of p-tert.-butylphenol, 17,500 g of water, 33,000 g of methylene chloride and 2,690 g of 45% strength sodium hydroxide solution while adjusting the pH value to 12–13 by adding a further 1,210 g of 45% strength sodium hydroxide solution. After the phosgene has been added, 6 g of triethylamine and 33 g of 1,4-bis-[(4',4''-dihydroxytriphenyl)-methyl]-benzene, corresponding to 0.35 mol per cent relative to bisphenol A, are added and the batch is stirred for a further hour.

The polycarbonate solution is washed until it is practically free of ions, 7,500 g of chlorobenzene are added and the methylene chloride is evaporated off. The solution of the branched polycarbonate, thus obtained, gels to give a white, crumbly cake, which is granulated and dried for 15 hours under reduced pressure at 120°C. The relative viscosity of the resulting polycarbonate is 1.339.

The pulverulent branched polycarbonate is fused in a single-flight three-zone screw (S 30/20 D; compression ratio 1 : 2.75) at 310°C and extruded through a slit die, also heated to 310°C, which has a die width of 300 mm and a gap width of 0.3 mm, to give a flat film. The extrudate is drawn off over a pair of cooling rollers heated to 145°C, at a speed of 5 m/second, so that an 0.040 mm thick film results. Because of the low blocking effect, the film can, without difficulty, be wound up free of creases to form a firm roll.

The change in the elongation at break after the treatment with solvents, and the resistance towards the styrene solution of unsaturated polyester casting resin are shown in Table 1 and the dielectric data and the breakdown resistance are shown in Table 2.

Example 2

Instead of the branching agent used in Example 1, 20.3 g (corresponding to 0.35 mol per cent relative to bisphenol A) of tetra-(4-hydroxyphenyl)-methane are employed. All the remaining conditions are the same as those in Example 1.

The branched polycarbonate thus obtained has a relative viscosity of 1.335.

The processing of the powder particles to give a film is carried out in the same machine as in Example 1, but at a temperature of 290°C. The properties of the practically non-adhering film are shown in Tables 1 and 2.

The above-mentioned branching agent is manufactured as follows:

a. Manufacture of bisphenol-F-bisphenylcarbonate 62.6 G of chloroformic acid phenyl ester are added dropwise over the course of 30 minutes to a two-phase solution of 40 g of bis-(4-hydroxyphenyl)-methane(bisphenol-F), 600 g of methylene chloride, 300 g of water, 41.4 g of 45% strength sodium hydroxide solution and 0.240 g of triethylamine at 25°C. After stirring for 1 hour, 3.1 g of unreacted bisphenol-F are again isolated from the aqueous phase and the organic phase is washed with dilute sodium hydroxide solution, then with dilute hydrochloric acid and finally with water. After drying the solution and distilling off the methylene chloride, recrystallization of the residue from 300 ml of cyclohexane yields 73.8 g (84% of theory) of bisphenol-F-bisphenyl-carbonate of melting point 97.5 to 98°C.

b. Manufacture of 4,4'-dihydroxydiphenyl-dichloromethane-bis-phenylcarbonate

66 G of bisphenol-F-bisphenylcarbonate are chlorinated in 100 g of chlorobenzene at 80° to 100°C, using a 250 watt lamp as the source of light and heat, until a weight increase of 15 g has occurred. After adding 60 ml of ligroin, the dichloro compound crystallizes out during cooling. After filtration, washing with benzene and drying over paraffin, 59 g (76% of theory) of product of melting point 100° to 101°C are obtained.

Analysis: $C_{27}H_{18}Cl_2O_6$ (509.35).

Calculated: 13.95% Cl.

Found: 14.20% Cl (total); 13.75% Cl (saponifiable).

c. Manufacture of tetra-(4-hydroxyphenyl)-methane 400 g of 4,4'-dihydroxydiphenyl-dichloromethane-bis-phenylcarbonate are added to a mixture of 735 g of phenol and 65 g of sodium acetate at 50°C, whereupon the mixture assumes a deep red color, thereafter the bath temperature is raised at an hourly rate of 20°C up to 170°C (sump temperature 130°C), and the excess phenol is then distilled off under reduced pressure over the course of 1 hour. The residue is taken up in 2 liters of ethanol, 500 g of potassium hydroxide are added and the mixture is boiled for three hours. Thereafter the mixture is dissolved in water, the tetraphenol is precipitated by means of dilute hydrochloric acid and the alcohol is steam-stripped off. After filtration, 273 g of crude product (90.5% of theory) are obtained, which when recrystallized from dioxane yield 169 g of melting point 303° to 309°C as colorless needles.

Analysis: $C_{25}H_{20}O_4$ (384.44).

Calculated: C 78.11% H 5.24%.

Found: C 77.8% H 5.01%.

Example 3 a. Manufacture of ortho-terephthalic aid hexaphenyl ester

A solution of 31.3 g of hexachloro-p-xylene in 50 ml of chlorobenzene is added dropwise, at about 16°C, to a solution of 141 g of phenol in 120 g of anhydrous pyridine, thereafter the mixture is heated to a sump temperature of 100°C, and this temperature is maintained for 5 hours. After cooling, methylene chloride and water are added to the mixture, the organic phase is separated off and evaporated and the residue is digested with ethanol and recrystallized from butanol in the presence of active charcoal. 25 g of colorless crystals of melting point 200° to 201°C are thus obtained.

Analysis: $C_{44}H_{34}O_6$ (658.71).

Calculated: C 80.22% H 5.20%.

Found: C 79.5% H 5.69%.

b. Manufacture of precondensate containing hexa-(4-(2-(4-hydroxyphenyl)-isopropyl)-phenyl)-ortho-terephthalic acid ester 1 mol of ortho-terephthalic acid hexaphenyl ester and 18 mols of 2,2-bis-(4-hydroxyphenyl)-propane are fused while excluding air. The phenol liberated is distilled off over the course of one hour at a heating bath temperature of 180° to 200°C (503 g). The contents of the flask are allowed to cool and the glassy product is ground.

c. Manufacture of the branched polycarbonate 1,190 g of phosgene are introduced over the course of 100 minutes into a mixture of 2,250 g of 2,2-bis-(4-hydroxyphenyl)-propane, 38 g of p-tert.-butylphenol, 26,000 g of water, 28,000 kg of methylene chloride and 1,720 g of 45% strength sodium hydroxide solution at 25°C. During the phosgenation, the pH value is adjusted to ≥ 12 by dropwise addition of 300 g of 45% strength sodium hydroxide solution.

For the polycondensation, 41 g of precondensate manufactured under (b) (corresponding to 0.1 mol percent of branching agent relative to bisphenol-A), 5 g of triethylamine and 410 g of 45% strength sodium hydroxide solution are added and the mixture is stirred for a further hour. The organic phase is washed with 2% strength phosphoric acid and is subsequently repeatedly washed with deionised water.

The isolation of the branched polycarbonate is carried out analogously to Example 1; the polycarbonate has a relative viscosity of 1.340.

The processing of the granular powder to give a flat film is carried out in the same machine as in Example 1, at a temperature of 300°C. The properties of the non-blocking film are reproduced in Tables 1 and 2.

Example 4 (Comparison Example)

For comparison purposes, a polycarbonate is manufactured analogously to Example 1, using 11.5 g (0.22 mol percent, relative to bisphenol-A) of 2,6-bis-(2-hydroxy-5-methylphenyl)-4-methylphenol as the branching agent and 53 g of p-tert.-butylphenol as the chain stopper.

The relative viscosity of the branched polycarbonate is 1.342.

The polycarbonate obtained is extruded analogously to Examples 1 and 2, at 290°C, to give a flat film.

The properties of the film are shown in Tables 1 and 2.

Example 5 a. Manufacture of tetra-[4-(dimethyl-4-hydroxyphenyl)-methylphenoxy]-methane

1 Mol of ortho-carbonic acid tetraphenyl ester and 12 mols of 2,2-bis-(4-hydroxyphenyl)-propane are fused in a glass flask, with exclusion of oxygen. The phenol formed is distilled off under reduced pressure (330 g) at a heating bath temperature of 180° to 200°C. After the contents of the flask have cooled, the glassy product is comminuted in a beater mill. This precondensate can be employed as the branching component.

In order to isolate the monomeric branching agent, the powder is extracted with methylene chloride and from 45 g, 14 g of tetra-[4-(dimethyl-4-hydroxyphenyl)-methyl-phenoxy]-methane are thus obtained in the form of a colorless glass.

Analysis: $C_{61}H_{60}O_8$ (921.16).
Calculated: C 79.57% H 6.57%.
Found: C 79.4% H 6.68%.

b. Manufacture of the branched polycarbonate

In an apparatus suitable for the customary continuous manufacture of polycarbonate, 61,200 g of a solution of 135,000 g of 2,2-bis-(4-hydroxyphenyl)-propane, 630,000 g of water, 105,000 g of 45% strength sodium hydroxide solution, 100 g of sodium borohydride and 2,300 g of p-tert.-butylphenol are phosgenated hourly, in a phase boundary reaction, with 4,750 g of phosgene in 90,000 g of a mixture of 60 parts by volume of methylene chloride and 40 parts by volume of chlorobenzene. After adding a solution of 16,850 g of 10% strength sodium hydroxide solution, 40 g of triethylamine and 134 g (0.35 mol percent, relative to bisphenol-A) of tetra-[4-(dimethyl-4-hydroxyphenyl)-methyl-phenoxy]-methane per hour and allowing the reaction to continue for an average time of 30 minutes, a solution of branched polycarbonate is obtained, which, after removal of the aqueous phase, is washed with dilute phosphoric acid and repeatedly with practically non-ionic water. The solvent is removed in a continuously operating evaporation screw and the solvent-free melt of the branched polycarbonate is extruded at 310°C to give a ribbon which is comminuted to granules having a relative viscosity of 1.418.

The granules are extruded, as described in Example 1, at 340°C to give a flat film of which the properties are shown in Tables 1 and 2.

Example 6

A branched polycarbonate with a relative viscosity of 1.410 is obtained analogously to Example 5 but using 51.9 g/hour (0.2 mol percent, relative to bisphenol-A) of 1,4-bis-[(4',4''-dihydroxytriphenyl)-methyl]-benzene as the branching agent and 2,110 g of p-tert.-butylphenyl as the chain stopper. The extrusion of the polycarbonate granules is carried out with a single-flight three-zone screw (S 45/25 D) which has a shear section in the metering zone. Under conditions otherwise comparable to Example 1, a film draw-off speed of 10 m/second gives a practically non-adhering film of 0.04 mm thickness, the properties of which are shown in Tables 1 and 2.

Example 7 (Comparison Example)

For purposes of comparison, an experiment is carried out analogously to Example 5, but without branching agent. The amount of p-tert.-butylphenol used as the chain stopper is 1,880 g so that an unbranched polycarbonate having a relative viscosity of 1.393 results.

The processing of the granules to give a flat film takes place analogously to Example 6, but at a temperature of 300°C. The properties of the strongly adhering film are shown in Table 1.

Example 8

A branched polycarbonate is manufactured analogously to Example 5 with an amount of chain stopper reduced compared to Example 5, namely 2,010 g of p-tert.-butylphenol. A branched polycarbonate of relative viscosity 1.525 is thus obtained.

The granules are extruded as described in Example 1, at 330°C, to give a practically non-adhering film of which the properties are shown in Tables 1 and 2.

Table 1 which follows shows, for reasons of comparison, alongside the pattern of properties of the extruded films of branched polycarbonates, according to the invention (Examples 1 to 3 and 5 and 6), also the pattern of properties of extruded films of unbranched polycarbonates (Example 7, commercial product MAKROLON 3200), and does so in the relevant viscosity ranges of 1.33 to 1.34 and 1.39 to 1.42.

In the case of the polycarbonates of high relative viscosity, an extruded film according to the invention (Example 8) is compared with a commercially available cast film (MAKROFOL N) for which extrusion is no longer possible.

TABLE 1

| Polycarbonate | Branching Agent mol % | Reactive Hydroxyl Groups | Type of Film | Relative Viscosity at 25°C (0.5 g in 100 ml of methylene chloride solution) | Untreated Film Tensile Strength[3] kp/cm² | Elongation at Break[3] % |
|---|---|---|---|---|---|---|
| Example 1 | 0.35 | 4 | flat film | 1.339 | 7.8 | 102 |
| Example 2 | 0.35 | 4 | flat film | 1.335 | 9.0 | 96 |
| Example 3 | 0.10 | 6 | flat film | 1.340 | 9.1 | 120 |
| Example 4 | 0.22 | 3 | flat film | 1.340 | 8.5 | 155 |
| Makrolon 3200[4] | — | — | flat film | 1.327 | 8.1 | 160 |
| Example 5 | 0.35 | 4 | flat film | 1.418 | 8.2 | 90 |
| Example 6 | 0.20 | 4 | flat film | 1.410 | 8.0 | 94 |
| Example 7 | — | — | flat film | 1.393 | 8.8 | 145 |
| Example 8 | 0.35 | 4 | flat film | 1.525 | 9.7 | 93 |
| Makrofol N[5] | — | — | cast film | 1.700 | 12.7 | 160 |

| Polycarbonate | Film after 10 seconds[1] storage in toluene/n-propanol residual elongation at break(relative to initial value) | | Resistance[2] of the film to a styrene solution of unsaturated polyester casting resin | Blocking Force[6] |
|---|---|---|---|---|
| | 1:3 % | 1:3.5 % | | p/cm² |
| Example 1 | 10 | 85 | resistant | — |
| Example 2 | 13 | 94 | resistant | — |
| Example 3 | 14 | 87 | resistant | — |
| Example 4 | — | 11 | slightly swollen | 50 |
| Makrolon 3200[4] | — | 6 | severely swollen and warped | 120 |
| Example 5 | 67 | 100 | resistant | — |
| Example 6 | 73 | 96 | resistant | — |
| Example 7 | 14 | 26 | slightly swollen | 130 |
| Example 8 | 90 | 97 | resistant | — |
| Makrofol N[5] | 67 | 100 | resistant | 800 |

Legend to Table 1

[1] 15 Mm wide test strips of the films of 0.04 mm thickness, are spirally wound round a glass rod of 8 mm diameter and then stored for 10 second in the toluene/n-propanol mixtures. After drying, the test strips are subjected to the tensile test according to DIN 53,455.

[2] 10 Mm wide test strips of the films of 0.04 mm thickness, are embedded in the styrene solution of an unsaturated polyester casting resin and the cross-section of the film is assessed after curing the casting resin.

[3] According to DIN 53,455.

[4] Commercial product of BAYER AG.

[5] Cast film of high molecular polycarbonate (commercial product of BAYER AG).

[6] Two 15 mm wide and 200 mm long strips of the films, placed on top of one another, are subjected to a pressure of 1.6 kg/cm² for 15 minutes. After removing the load, the force which must be applied to separate the film strips in the parallel direction is measured.

What is claimed is:

1. In the process of producing a polycarbonate suitable for film extrusion having a relative viscosity measured at a concentration of 0.5 g of polycarbonate in 100 ml of methylene chloride solution at a temperature of 25°C of between about 1.35 and about 1.55 by reacting an aqueous alkaline solution of an aromatic dihydroxy compound with phosgene under the conditions of a phase boundary reaction the improvement which comprises the sequential steps of a. allowing the reaction to proceed to give an oligomeric polycarbonate having a degree of polymerization of about 5 to 15;

b. adding a catalytic amount of tertiary amine and about 0.05 to 2.0 mol percent relative to the aromatic dihydroxy compound, of a branching agent having more than three phenolic hydroxy groups to the phase boundary reaction mixture; and c. allowing the condensation reaction to go to completion.

2. In the process of claim 1 the further improvement wherein about 0.05 to 0.5 mol percent of the branching agent is added.

TABLE 2

| Polycarbonate | Dielectric strength at 50 Hz | | | Dielectric loss factor at 50 Hz × 10⁴ | | | Specific volume resistance × 10⁻¹⁶ | | |
|---|---|---|---|---|---|---|---|---|---|
| | 20°C | 100°C | 150°C | 20°C | 100°C | 150°C | 20°C . cm | 100°C . cm | 150°C . cm |
| Example 1 | 2.97 | 2.95 | 2.94 | 8 | 6 | 10 | 4.8 | 2.2 | 0.3 |
| Example 2 | 2.91 | 2.90 | 2.88 | 11 | 9 | 15 | 7.0 | 2.2 | 0.07 |
| Example 3 | 2.92 | 2.92 | 2.90 | 9 | 8 | 16 | 4.7 | 2.1 | 0.1 |
| Example 4 | 2.92 | 2.92 | 2.93 | 10 | 11 | 40 | 5.5 | 2.2 | 0.2 |
| Example 5 | 2.98 | 2.98 | 2.97 | 8 | 7 | 10 | 4.0 | 2.1 | 0.2 |
| Example 6 | 2.97 | 2.95 | 2.94 | 8 | 6 | 10 | 4.8 | 2.2 | 0.3 |
| Example 8 | 2.98 | 2.98 | 2.97 | 8 | 7 | 10 | 4.0 | 2.1 | 0.2 |
| Makrofol N[1] | 3.00 | 2.90 | 2.75 (145°C) | 15 | 10 | 42 (145°C) | 12.0 | 1.5 | 0.04 (140°C) |

[1] Cast film of high molecular polycarbonate (commercial product of BAYER AG).

3. In the process of claim 1 the further improvement wherein about 0.10 to 0.35 mol percent of the branching agent is added.

4. The polycarbonate produced by the method of claim 1.

5. The polycarbonate produced by the method of claim 2.

6. The polycarbonate produced by the method of claim 3.

* * * * *